United States Patent Office 2,872,289
Patented Feb. 3, 1959

2,872,289

PROCESS IN RECOVERING SULPHUR FROM WASTE SULPHITE LYE

Hans Olof Samuelson, Goteborg, Sweden, assignor to Aktiebolaget Rosenblads Patenter, Stockholm, Sweden, a corporation of Sweden No Drawing. Application May 10, 1955
Serial No. 507,488

Claims priority, application Sweden May 12, 1954

3 Claims. (Cl. 23—129)

This invention relates to methods of sulphur recovery from waste sulphite lye.

The combustion gases obtained on burning waste sulphite lye contain sulphur dioxide and a small proportion of sulphur trioxide. An economical recovery of sulphur from the combustion gases obtained when burning waste sulphite lye is complicated by the fact that the contents of sulphur dioxide in the gas is low, for instance 0.4 to 0.8 percent.

The present invention has for its object to eliminate the drawback referred to, by increasing the contents of sulphur dioxide in the gases of combustion, and thus enabling a recovery of sulphur therefrom in an economical way.

The method adopted according to the invention is based on a division of the combustion gases, in principle, into two streams A and B from which sulphur dioxide (and sulphur trioxide) is (are) separated, the sulphur recovered from one of these streams (A) being returned to the furnace and burned together with the sulphite lye therein. The gases of the other stream (B) is subjected to a sulphur recovery process for the preparation of the bisulphite solution used in the boiling process. The increased contents of sulphur dioxide in the combustion gases, as compared with the methods as presently practiced, involves material technical advantages, in the first place a decrease in the oxidation of sulphur dioxide into sulphur trioxide. In addition, the necessary equipment will, as a rule, be materially simplified.

For the object stated, the method according to the invention is mainly characterized in that the combustion gases containing sulphur dioxide are supplied to at least two absorption units, A and B, preferably for the absorption of sulphur dioxide, the absorbent utilized in at least one of these absorption units (A) being returned to the furnace for combustion after completion of the absorption process, and possibly after evaporation or other treatment, whereas the sulphur dioxide recovered in a second absorption unit (B) is utilized directly or indirectly for the preparation of boiling liquid for the digestion of wood.

Normally, the absorbent utilized in the absorption unit A will contain waste sulphite liquor, or it consists wholly or essentially of waste sulphite lye, which possibly may be subjected to a certain degree of evaporation.

The method is applicable independently of the cation or cations contained in the liquor being burned, although, inter alia depending on the kind of cation present in the liquor, the details of the method may be devised in partially different ways in order to attain the optimum results.

In connection with sulphite liquors containing either of the cations: sodium, magnesium or calcium, or a mixture thereof, possibly admixed with ammonium, the method is preferably carried out in such a way that, in at least one absorption unit (A) the combustion gases are subjected to treatment with ashes from the combustion of waste sulphite liquor, after said ashes have been suspended in the absorption liquid, or they have otherwise been brought into contact with the latter. In this case it is frequently suitable not, or only partially, to remove accompanying ashes from the combustion gases supplied to the actual absorption unit (A).

According to a practical realization gases of combustion, for instance such gases containing ashes, can be subjected to treatment in the absorption unit (A), either with waste sulphite liquor, such as neutralized waste sulphite lye or with sulphite liquor carrying in suspension ashes from the combustion of waste sulphite liquor. The proportion of ashes which in such a case should be brought into suspension in the sulphite liquor to be used within the absorption stage (A), will be determined by the actual composition of the liquor, and particularly by the ratio of the sulphur contents to the contents of cations present in the liquor. For instance, in distillation-residual liquor from the production of sulphite alcohol, wherein the amount of cations is comparatively high, it may be unnecessary to make any extra addition of ashes into the absorption unit in excess of any amount of ashes which may accompany the proportion of the combustion gases supplied to the relevant absorption unit (A). The absorption unit (A) could consist of one or more absorption towers (scrubbers) for instance, or of cascade apparatus, or of any suitable other absorption apparatus known in the art. After the absorption liquid has absorbed an amount of sulphur dioxide the absorption liquid is burned which is preferably carried out only after evaporation. It may be suitable, after the absorption process to pass the absorption liquid through a precipitation apparatus, such as a sedimentation apparatus or a hydro-cyclone, for example.

As previously stated, a proportion of the gases is supplied to a second absorption unit (B). The sulphur dioxide recovered in this unit is utilized directly or indirectly for the preparation of boiling liquid for the disintegration of wood. Within this absorption unit the combustion gases, preferably after cooling to a low temperature of, for instance 77 to 140° F., are treated with a solution or suspension of any suitable absorbent to cause absorption of sulphur dioxide according to conventional methods. Examples of suitable absorbents are calcium and magnesium compounds, for instance oxides and carbonates, suspended or wholly or partially dissolved in water. To advantage, a suspension of ashes resulting from the combustion of waste sulphite liquor may be employed. Ashes obtained from the combustion of liquor on a magnesium basis will be excellently suited in connection with the types of boilers as presently in general use for the combustion of sulphite liquor, but ashes from liquor on a calcium basis can also come into question, although in the application of this modification of the present invention the combustion preferably should be carried out in such a way as to maintain the sulfate contents of the ashes as low as possible. This may be accomplished, for example, by using an increased combustion temperature.

It is possible to use as the absorption liquid in the stage B an aqueous solution containing sodium compounds such as, for instance, its hydroxide, carbonate or bicarbonate, as well as a solution containing ammonia. In respect of each one of the absorption liquids enumerated above for use in the stage B, the sulphur-dioxide containing solution can be used for the digestion of wood, preferably after strengthening with sulphur dioxide, for instance from the boiling plant, and/or from the combustion of sulphur or sulphur-containing minerals, such as for example, pyrite. As a rule it will be necessary to filter the liquid, for instance through a sand filter, as well as to adjust the composition of the solution through usual additions.

It is not necessary that the same base (cation) is present in the sulphite liquor to be burned, and in the boiling solution used for the digestion of wood. On the contrary, it may be suitable in many instances to operate with different bases. In accordance with the method of the present invention it is possible, for example, to operate the process in such a way that in at least one absorption unit (A) the combustion gases are subjected to treatment with a liquid containing sulphite liquor, and said liquid may have been brought into contact with sulphite liquor ashes which have accompanied the gases or otherwise have been introduced into the liquid, whereas in a second absorption unit (B) the combustion gases, subsequently to ash separation and cooling, are treated with an ammonia-containing solution, the absorption solution obtained from the last-mentioned unit (B) being used directly or indirectly for the production of boiling liquid to be utilized in the disintegration of wood.

According to an embodiment in which ammonia is used as the absorption liquid in the stage B, the digestion of wood by means of the solution containing ammonia and sulphur dioxide is carried out after the composition of the latter has been corrected by gasing up the same with sulphur dioxide from the sulphite boiling process. After completing the digestion there is added to the sulphite liquor obtained ashes resulting from the combustion of sulphite liquor, for instance, preferably, ashes containing magnesium oxide and/or calcium oxide, in which operation ammonia is release and expelled. The ammonia obtained in this way is returned to the stage B. The sulphite liquor ashes used for the expulsion is obtained by burning the sulphite liquor after having expelled the ammonia and in the course of the liquor being evaporated subsequently, or in conjunction with the expulsion.

However, the method may also be applied in a fundamentally different way, namely by undertaking the absorption within the absorption unit B in a liquid from which the sulphur dioxide is removed, for instance by expulsion or by precipitation as a difficultly soluble sulphite, for example, calcium sulphite, and utilizing, in a manner known per se, directly or indirectly, the sulphur dioxide thus expelled, or the sulphite precipitated, respectively, for the preparation of boiling liquid for the digestion of wood. According to this modified embodiment, the absorbent used in the stage B may for instance consist of solutions of inorganic compounds, such as, for example, sodium carbonate, ammonia, organic bases, such as, for example dimethyl aniline and xylidine, or ampho- teric electrolytes.

The burning of the sulphite liquor, and, in the relevant cases, the separation of ashes may be carried out in accordance with any suitable conventional methods. In this connection, direct combustion in the presence of an excess of air may be carried out, but also a step-by-step combustion may be provided for, for instance in such a way as to cause an initial combustion to take place in a reducing atmosphere, after which the gases obtained are burned in an oxidizing atmosphere in a second stage. Also a pyrolysis according to conventional methods may be used as intermediate stage in the total combustion process. Before supplying the combustion gases obtained to the absorption units, said gases may suitably be cooled in a steam generator and/or possibly in other heat recovering apparatus, this cooling taking place down to a temperature lower than 1112° F. (660° C.), preferably lower than 572° F. (300° C.), for instance 122 to 428° F.

What I claim is:

1. In a process for recovering sulphur values from combustion gases containing sulphur dioxide resulting from the burning of a stream of waste sulphite lye in a combustion step by absorbing sulphur dioxide from said combustion gases in an absorption step and utilizing the absorbed sulphur dioxide for the preparation of boiling liquid for the digestion of wood, the improvement which comprises the steps of dividing the combustion gases emanating from said combustion step into two separate streams, preparing the boiling liquid by absorbing $SO_2$ from one of said gas streams in an aqueous liquid and absorbing $SO_2$ from the other of said gas streams in said sulphite lye stream prior to the burning of said sulphite lye.

2. A process according to claim 1 wherein the said waste sulphite lye is evaporated subsequent to the said absorption of $SO_2$ to thereby increase the concentration of combustible material therein prior to the burning of said absorbent in said combustion step.

3. A process according to claim 1 wherein said waste sulphite lye is neutralized waste sulphite lye.

References Cited in the file of this patent

UNITED STATES PATENTS

| | | |
|---|---|---|
| 1,931,536 | Goodell | Oct. 24, 1933 |
| 2,303,811 | Badenhausen | Dec. 1, 1942 |
| 2,572,929 | Hazelquist | Oct. 30, 1951 |
| 2,593,503 | Tomlinson et al. | Apr. 22, 1952 |
| 2,702,235 | Hochmuth | Feb. 15, 1955 |